Figure 1:
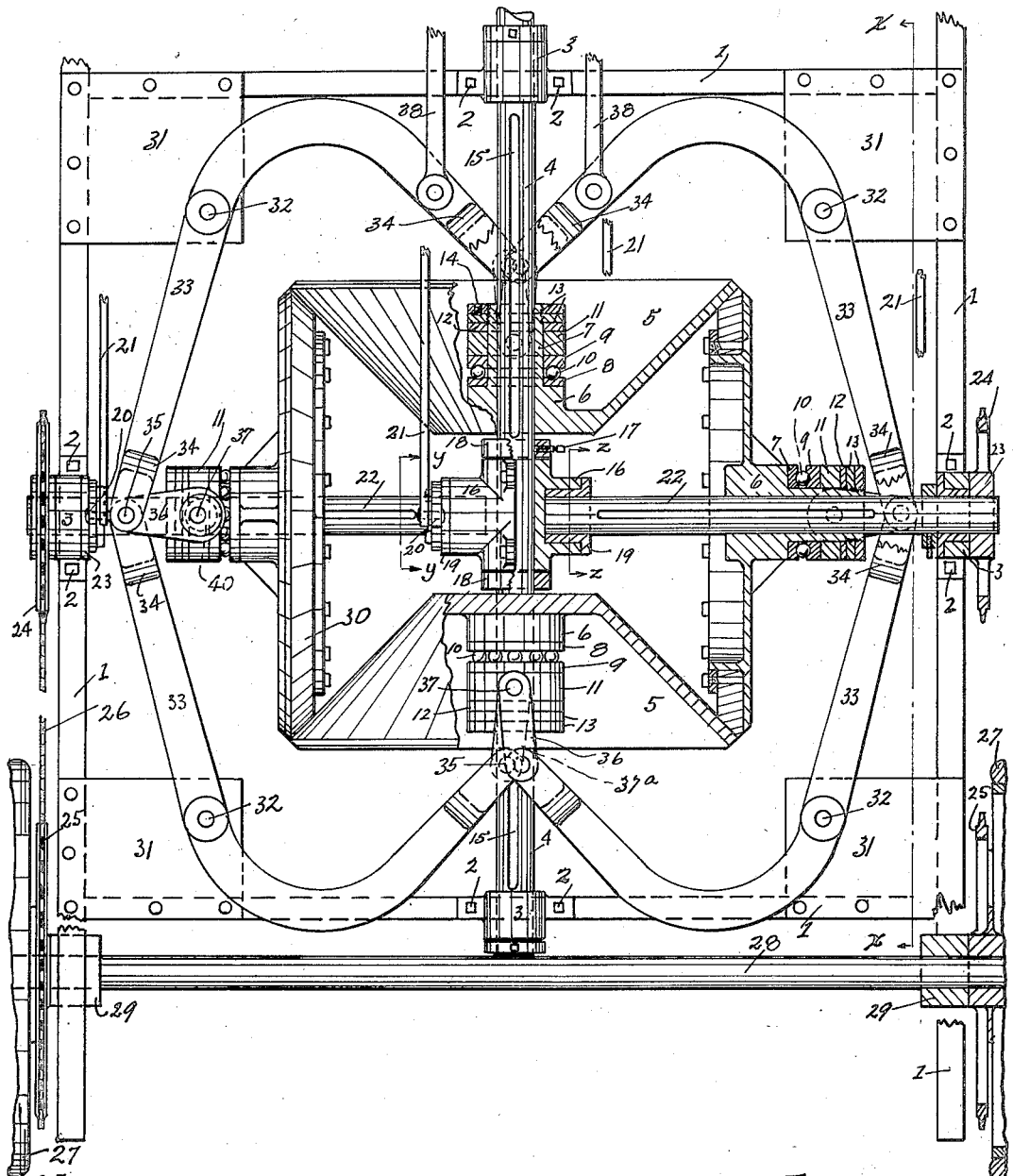

L. W. DAVIS.
POWER TRANSMISSION MEANS.
APPLICATION FILED SEPT. 29, 1913.

1,107,412.

Patented Aug. 18, 1914.

2 SHEETS—SHEET 1.

Witnesses:
Frank H. Fowler
Frances L. Fowler

Inventor
Lewis W. Davis
by Fred P. Gorin
Attorney

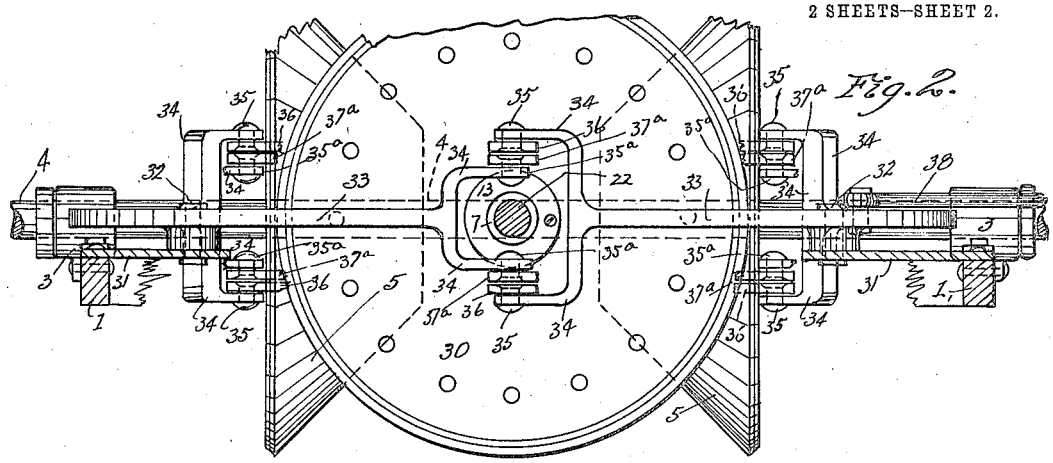

UNITED STATES PATENT OFFICE.

LEWIS W. DAVIS, OF SEATTLE, WASHINGTON.

POWER-TRANSMISSION MEANS.

1,107,412.  Specification of Letters Patent.  Patented Aug. 18, 1914.

Application filed September 29, 1913. Serial No. 792,501.

*To all whom it may concern:*

Be it known that I, LEWIS W. DAVIS, a citizen of the United States, and a resident of Seattle, in the county of King and State of Washington, have invented certain new and useful Improvements in Power-Transmission Means, of which the following is a full, true, and exact specification.

This invention relates to power transmission means, and more especially to such means as is applied to automobiles, and has for its principal object, to provide means of this character in connection with which no differential mechanism is required for the driving traction wheels, and in which friction is relied upon instead of the usual spur gears, to transmit the power.

An important feature of the invention is the means for reversing the direction of rotation of the driven element.

Other features and objects will appear as the invention is more fully described and explained in the following specification, shown in the accompanying drawings, and pointed out in the appended claims.

In the drawings, Figure 1 is a plan view of my device, partly in section and with parts broken away, as applied to the chassis on an ordinary automobile. Fig. 2 is a similar view in side elevation, upon the line x—x of Fig. 1, with some parts omitted. Fig. 3 is a detailed side elevation upon the line Y—Y of Fig. 1, looking in the direction of the arrows. Fig. 4 is a similar view upon the line z—z of the same figure, looking in the direction of the arrows.

Referring now more particularly to the drawings, reference numeral 1 designates the chassis of an automobile which may be of usual construction and secured to which, at 2, are the bearings 3. In one pair of the said bearings is revolubly mounted the propeller shaft, upon which are mounted the friction cones 5. The hubs 6 of the said cones are reduced at 7, and upon each of said reduced portions is loosely mounted a washer 8, between which and the similar washer 9 are the anti-friction balls 10. Adjacent to the washer 10, is the collar 11, next to which is a washer 12, the said washers and collar being held in place by the nuts 13, which are screw threaded upon the outer end of the reduced portion 7, as shown, and in one of the said nuts may be the headless screw 14, to more firmly bind the nuts against movement with respect to the said reduced portion 7. The said cones revolve with the propeller shaft 4, but are at the same time slidable thereon by means of a suitable feather key, whose inner end wipes along in the key way 15. Loosely mounted upon the propeller shaft 4 is the fourway bearing 16, at each side of which, and secured to the said shaft by means of the binding screws 17, are the two collars 18. Revolubly mounted within the bearings which are each at the side of the said fourway bearing, are the eccentrically bored bushings 19. The eccentricity of each of said bores with regard to their respective bushings is best seen in Figs. 3 and 4, by reference to which it will be noted that when the parts are in normal position, as seen in the drawings, the center of the bore in one of the said bushings is above the center of the bore of the other bushing. Secured to each of the said bushings, is an arm 20, to the upper end of which is connected one end of a draw bar 21, which extends to the forward part of the machine. Revoluble within the bore of each of the said bushings is one end of a jack shaft 22, whose opposite end is similarly mounted within a bushing 23 which is revoluble within one of the bearings 3, which are at each side of the chassis. The bushing 19 which is at the right hand side of the propeller shaft 4 is an exact duplicate of the bushing 23 which is on the same side of that shaft, and the other bushings 19 and 23 are duplicates of each other, and each of the said bushings has connected to it, an arm 20 and a draw bar 21. Each jack shaft 22 passes through one of the bushings 23, and has affixed to its outer end, a sprocket wheel 24, around which, and the similar wheel 25, passes a sprocket chain 26. Each of the wheels 25 is fixed to one of the traction wheels 27 which are revoluble upon the axle 28. The said axle passes through the thickened portions 29 of the chassis 1, and may either revolve with respect to the chassis or be fixed thereto, as either construction permits rotation of each of the traction wheels 27 upon the axle 28, independently of each other, so that the usual differential gearing is not required upon the said axle. Mounted upon each of the jack shafts 22, in a manner substantially identical with that with which the cones 5 are mounted upon the propeller shaft, is a friction disk 30, whose hubs and directly associated parts are identical with the hubs and similar parts of the said cones, which have already been fully described.

To each of the four corners of the chassis 1 is fixed a plate 31, upon which is pivoted, at 32, a curved arm 33, each of whose ends terminates in the branches 34. The said arms are arranged in pairs and the edges of one of said pairs are plainly seen in Fig. 2. The branches 34 of one of each pair of the arms 33, span the branches 34 of the other arm of that pair, as plainly seen in Fig. 2, and have connected to each of them, by means of a pin 35, one of the ends of a link 36, the opposite end of which is similarly connected, by means of a pin 37, to one of the collars 11. Each branch 34 of the other arm of each pair is similarly connected by means of a pin 35$^a$, to one end of a link 37$^a$, whose opposite end is similarly connected to one of the pins 37. The links 36 which are at each side of the chassis differ somewhat in shape from those which are fore and aft of the chassis, but all of the said links have similar functions. Each of the pins 37 which enter the collars 11 which are at each side of the chassis, are surrounded by a bushing indicated by the dotted outline at 40 in Fig. 1, and the said pins enter the said bushings eccentrically of the latter, as plainly seen in Fig. 1, so that, as wear occurs in the friction faces of the cones 5 and the disks 30, the same may be compensated for by turning the bushings 40 with respect to the collars 11 as will be understood, and any suitable means—such as an ordinary binding screw in the collar 11—may be used to hold the bushings 40 in their various positions as the same are turned, as above indicated.

From the foregoing, it is believed that the construction and operation of my device will be fully understood by others skilled in the art. It is clear that a forward simultaneous movement of the draw bars 38 will, through the intervening connections described, cause the cones 5 to move away from each other along the propeller shaft 4 and at the same time cause the two friction disks 30 to move toward each other along their respective jack shafts 22, so that varying speeds may be transmitted from the propeller shaft to the said jack shafts and thence, through the sprocket wheels 24, chains 26, and sprocket wheels 25, to the traction wheels 27. It is also clear that when the cones 30 are moved away from each other as above indicated, the forward simultaneous movement of the draw bars 21 will cause all of the bushings 19 and 23 to turn in their respective bearings, which, due to the eccentric mounting of the jack shafts 23 with respect to said bushings, causes one of the said jack shafts to move toward the front of chassis and the other to move in the opposite direction, whereby one of the friction disks 30 is caused to move into firm frictional contact with the forward cone 5, and the other disk moves into similar contact with the other cone, so as to reverse the power transmitted to the traction wheels.

While I have shown a particular embodiment of my invention, I am aware that many minor changes therein will readily suggest themselves to others skilled in the art without departing from the spirit and scope of the invention and I therefore desire to avoid being limited to the exact form shown and described, except as defined by the appended claims.

What I claim as new, and desire to protect by Letters Patent is—

1. In a device for transmitting variable speeds, the combination of a supporting frame, a propeller shaft mounted thereon, a pair of jack shafts disposed at right angles to said propeller shaft, means for revolubly mounting one end of each of said jack shafts upon said propeller shaft and for mounting its opposite end upon the said supporting frame, said means including pairs of eccentrically bored bushings which normally hold the said jack shafts in different horizontal planes, a pair of friction cones feather keyed upon the propeller shaft and a friction disk similarly mounted upon each jack shaft, means for simultaneously rotating all of said bushings whereby one of said jack shafts is moved rearwardly and the other forwardly with respect to the said supporting frame, and means for simultaneously moving the said cones and the said friction disks with respect to each other.

2. In a device for transmitting variable speeds, the combination of a supporting frame and a propeller shaft mounted thereon, a pair of jack shafts disposed at right angles to said propeller shaft, means for revolubly mounting one end of each of said jack shafts upon said propeller shaft and for mounting its opposite end upon the said supporting frame, said means including eccentrically bored bushings which normally hold the said jack shafts out of alinement with each other, a pair of friction cones feather keyed upon the said propeller shaft and a friction disk similarly mounted upon each of said jack shafts, means for simultaneously rotating all of the said bushings whereby one of said jack shafts is moved in one direction and the other of said shafts in the opposite direction, and means for simultaneously moving the said cones and friction disks along their respective shafts, said means including levers arranged in oppositely disposed pairs and link connections between the same and the said cones and disks.

3. The combination with an automobile frame and a propeller shaft of a fourway bearing loosely mounted upon the said shaft, a pair of eccentrically bored bushings revolubly mounted therein and which are at right angles to the propeller shaft, a bearing at each side of the frame and a bushing in each of said bearings to normally match its mate which is on that side of the fourway bearing, a pair of jack shafts mounted within the said bushings and at each side of the propeller shaft, friction cones slidably but non-rotatably mounted upon the propeller shaft, a friction disk similarly mounted upon each of said jack shafts, means for simultaneously moving the said cones and disks along their respective shafts, and means for turning all of the said bushings simultaneously in their bearings whereby one of said jack shafts is moved in one direction and the other of said shafts moved in the opposite direction.

LEWIS W. DAVIS.

Witnesses:
 FRED P. GORIN,
 R. D. SMALLEY.